July 25, 1950  W. C. EHLERT ET AL  2,516,373
MOLD FOR MAKING INTEGRAL PLASTIC FRAMES AND LENSES
Filed Nov. 9, 1946
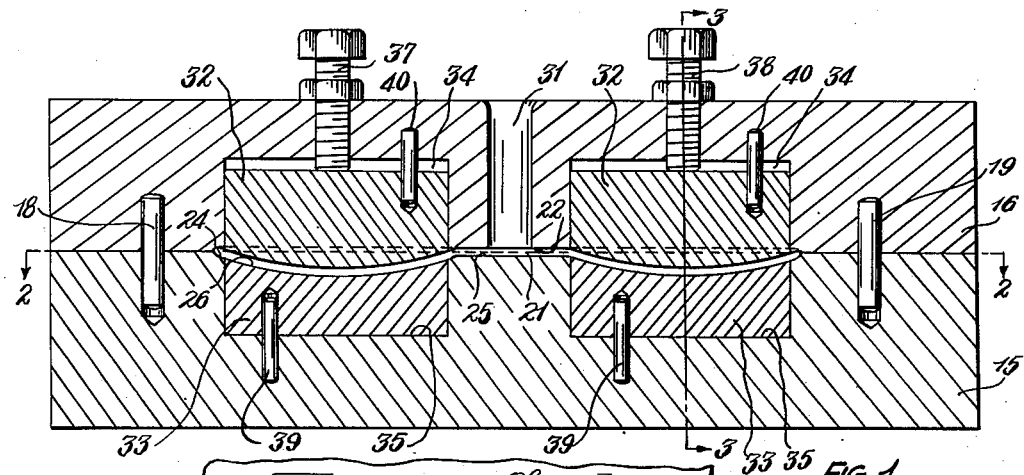
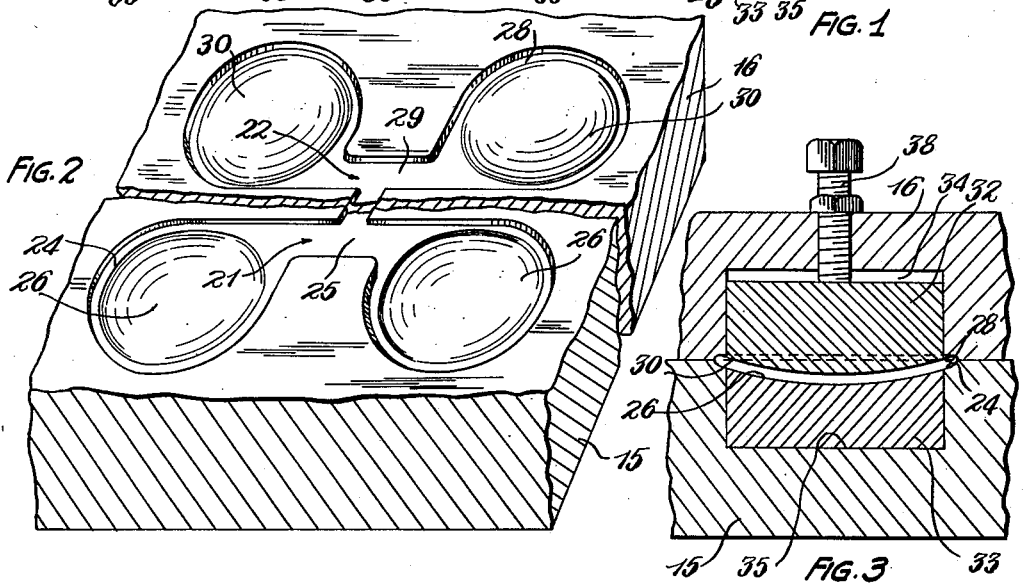
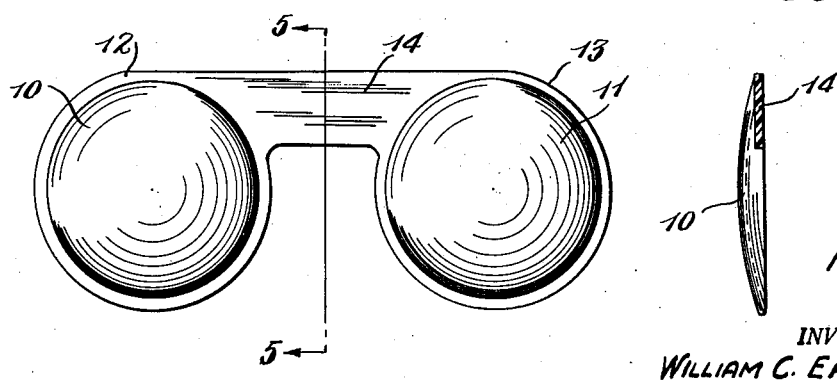
INVENTORS
WILLIAM C. EHLERT
BY FRANK J. SCHNEIDER
Kwis, Hudson, Boughton & Williams
ATTORNEYS Patented July 25, 1950

2,516,373

UNITED STATES PATENT OFFICE 2,516,373

MOLD FOR MAKING INTEGRAL PLASTIC FRAMES AND LENSES

William C. Ehlert, Warrensville Heights, and Frank J. Schneider, Jr., Pepper Pike, Ohio, assignors to Domar Products Inc., Cleveland, Ohio, a corporation of Ohio Application November 9, 1946, Serial No. 708,966

1 Claim. (Cl. 18—34)

This invention pertains to the art of molding plastic materials and, more particularly, to a mold for forming plastic optical devices such as, but not limited to, eye glasses.

An object of this invention is the provision of a new and improved mold capable of forming a precision lens and integral support therefor in a single molding operation.

Still another object of this invention is the provision of a new and improved mold for molding eye glasses out of a plastic having a molding cavity with frame forming and lens forming surfaces, the latter surfaces being finished to high optical standards.

A further object of this invention is the provision of a new and improved mold for producing integral lenses and supporting frames having an appropriately shaped cavity with lens forming surfaces made to high optical precision standards on suitably shaped members which are subsequently inserted into the mold.

Still a further object of this invention is the provision of a new and improved mold for forming integral plastic eye glasses having members with surfaces thereon finished to optical standards and inserted in the mold for forming lens molding surfaces coextensive with frame forming surfaces.

Still another object is the provision of a new and improved plastic mold having adjustable surfaces for accurately controlling critical dimensions of portions of the molded article.

Still another object of this invention is the provision of a new and improved plastic mold for molding integral the lenses and frame of a pair of eye glasses having adjustable lens forming surfaces for accurately controlling the thickness of the finished lens.

The invention resides in certain constructions and combinations and arrangements of parts, and further objects and advantages will be apparent to those skilled in the art to which it relates from the following description of the preferred embodiment described with reference to the accompanying drawing forming a part of this specification, and in which:

Fig. 1 is a cross-sectional view of a mold showing the preferred embodiment of the present invention;

Fig. 2 is a top view of the lower cavity block and a bottom view of the upper cavity block, the blocks being shown in exploded relationship;

Fig. 3 is a cross-sectional view on the line 3—3 of Fig. 1;

Fig. 4 is a front plan view of an article to be molded; and

Fig. 5 is a sectional view on the line 5—5 of Fig. 4.

Generally speaking, the invention comprises a mold having a cavity with precision finished surfaces, which surfaces are preferably movable relative to each other for permitting adjustment of relative dimensions of portions of the finished article.

While the invention to be described is particularly adaptable to the plastic molding of optical devices with a support and lens integral such as, but not limited to, eye glasses wherein the optical distortion of the lenses must either be held to a minimum or within close limits, it will be appreciated that the invention is also applicable to the formation of other plastic articles having dimensions or surfaces which are extremely critical in their thickness or finish, respectively.

The invention is shown as a mold for making a pair of eye glasses out of a plastic material wherein the molded product has a pair of lenses 10, 11, what may be called frames 12, 13 surrounding each lens 10, 11 respectively, and an interconnecting bridge 14 which also forms part of the frame. It will be appreciated that if desired the surfaces of the lenses 10, 11 could be made to extend all the way to the edge of the glasses, with the exception of the point wherein they are joined with the bridge 14, thus eliminating the frames 12, 13.

The mold for forming the eye glasses shown comprises a lower and upper cavity block 15, 16 formed of any suitable material, but preferably one which is fairly soft for easy machining but which may be subsequently hardenable by heat treatment. The blocks 15, 16 have suitable locating pins 18, 19 and apertures for insuring alignment of the blocks upon assembly and mating opposed cavities 21, 22 respectively in their opposing surfaces with a surface outline such as to produce the eye glasses shown or any other article which might be desired. The cavity 21 preferably has frame forming surfaces 24, bridge forming surfaces 25, and lens forming surfaces 26, while the cavity 22 has similar frame forming surfaces 28, bridge forming surfaces 29, and lens forming surfaces 30. It will be appreciated that the lens forming surfaces could be made to extend all the way to the edge of the cavity, thus eliminating the frame forming surfaces 24, 28, although this is not desired, for while it produces an article having the same high optical standards it produces one which is not as pleasing to the esthetic senses nor possibly as strong mechanically. A gate 31 may be provided in one or the other of the cavity blocks communicating with the cavity for admitting the plastic material from which the device to be molded will be formed.

While the lens forming surfaces 26, 30 can be formed to the high optical standards desired by suitably finishing surfaces integral with the upper and lower cavity blocks, it is preferred to form the surfaces on separate pairs of insert members 32, 33 in a machine capable of forming surfaces to high optical standards and subsequently insert the members into the cavity blocks 15, 16. To provide for the reception of these members in the mold, the surfaces of the cavity where the lenses will be formed are machined away to provide pairs of apertures 34, 35 in each block having an outline of the desired peripheral shape of the lenses 10, 11 and of any suitable depth. Preferably, the walls of these apertures are formed to close tolerances whereby the side walls of the aperture 34 in the lower cavity block 15 will be as close as possible, if not exactly parallel, to the side walls in the aperture 35 in the upper cavity block 16. Either one or the other of the apertures 34, 35 may be formed exactly to the depth of the insert member 32 or 33 which will be inserted therein. The other aperture is preferably formed to a depth slightly greater than the thickness of the insert member which will be positioned therein, permitting adjustment of the insert after assembly of the mold. Alternatively both cavities could be formed to a depth greater than the thickness of the aperture and shims utilized to adjust for the correct depth of insertion of the insert member therein. The edges of the inserts 32, 33 should be formed to a shape to conform as exactly as possible to the outlines of the apertures 34, 35 and to such close tolerances that when inserted in the apertures and material is injected into the cavity, the material will not flow between the members and the side walls of the apertures.

After the edges are formed, the insert members 32, 33 are preferably placed in a machine capable of grinding or polishing to high optical precision and using the edges as a reference surface the molding surfaces of the inserts are ground or otherwise polished preferably to a curved surface of high optical standards. The radii of curvature of each surface may be as desired, either spherical or otherwise, for producing non-corrective lenses or ones with any desired correction. For sun glasses which would be produced in quantities without respect to the ocular prescription of the wearer's eyes or which may be placed directly over other corrective eye glasses, it is preferred that the surfaces be segments of a sphere and parallel relative to each other. It will be appreciated that in order for the surfaces of each lens to be parallel, it will be necessary for the center of curvature of each surface to be exactly coincident with the other, which requires that the insert member with the concave surface have a radius of curvature which is greater than the radius of curvature of the convex surface on the other insert member by an amount which is equal to the spacing of the surfaces when in the mold or, in other words, to the thickness of the final molded lenses. Obviously within limits a degree of non-parallelism could be introduced by offsetting the centers of curvature.

The present invention contemplates a means for adjusting the relative position of the lens forming surfaces of the inserts 32, 33 so that the centers of curvature of the two surfaces can be made to exactly coincide and thus the surfaces of the molded lens be always equidistant. Such means in the embodiment shown comprise adjusting screw members 37, 38 threadably engaged in the mold and accessible from the outside thereof in engagement with the back surface of the insert member 32 and approximately in the center thereof whereby longitudinal adjustment of the screw moves the insert member 32 away from or toward the other insert member 33. It will be appreciated that other means could be provided for this adjustment, such as more than one screw or screws engaging each insert member or one or both members could be threadably engaged in the aperture. Alternatively, a shim or gasket could be positioned between the abutting surfaces of the lower and upper cavity blocks 15, 16 or between the base of the inserts 32, 33 and the base of the apertures 34, 35. In the event of using the latter alternative, threaded bolts or screws may extend from the exterior of the cavity blocks 15, 16 into the apertures 34, 35 where they will be threadably engaged into the base of the inserts 32, 33. Tightening of such bolts or screws would then draw the inserts firmly and snugly down against the base of the aperture and any shims which might be positioned therein. In other words, the invention provides a means for critically controlling within limits some of the final dimensions of the completed molded article. The adjustment provided permits compensation for shrinkages which might occur as the molding material cools, for possible variations of thickness over periods of time, for temperature changes, for variations in the molding pressures utilized, or for any other reason which might affect the desired final thickness of the lenses 10, 11 or the desired parallelism or non-parallelism of their surfaces.

For insuring long life of the cavity surfaces, the insert members and the lower and upper cavity blocks should preferably be of a hardened material. Preferably the members are formed very closely to the final dimension, heat treated, and subsequently ground or otherwise given a final machining operation, resulting in surfaces which are highly accurate and unaffected by any heat treating operation.

After the surfaces are all formed to the required dimensions and finish, the insert members are inserted into the apertures of the mold cavity using guide pins 39, 40 as a guiding means and also for preventing relative rotation of the inserts relative to the mold when once in position. The cavity blocks may then be assembled using the guide pins 18, 19 for insuring that the edges of the cavities will be accurately mated. Preferably, a trial run is then made and the thickness of each lens measured to determine if its thickness corresponds to the difference in the radii of curvature of the surfaces of the inserts. It it does and the other dimensions of the cavity have been carefully controlled in the manufacture of the mold, then all other points on the lens should have the same thickness. If the thickness does not correspond, it may be corrected by adjustment of the adjusting screws 37 or 38 in the proper direction or by the insertion or removal of shims if such had been used.

It will be appreciated that the material which may be used in the mold which has been described may be as desired, and may be either a powder which upon compression and application of heat flows plastically, or it may be a sheet which the mold stamps and shapes simultaneously, or in the preferred embodiment may be a plastic material which is injected into the cavity in a plastic state under high pressure. The color of the plastic may be as desired, dependent upon the ultimate use to which the lens and supporting frame will be applied. If it is desired that the lenses be of the corrective type and pass all visible rays of light, they may be of such clear plastics as are readily known, or if it is desired that they be used as sun glasses then dyes or suitable color filtering materials may be mixed with the plastic or a plastic having an inherent color capable of providing the filtering action may be utilized. If it is desired that the frame be a different color from that of the lenses, then that portion of the mold cavity which forms the frame and the bridge may be suitably covered with a colored material which will become impregnated with the plastic material upon a molding operation.

In the preferred embodiment, the frames and both lenses are formed integrally and simultaneously in a single molding step. It is, of course, possible to shape the mold cavity to form the glasses in separate parts subsequently joined by mechanical means, gluing, welding, or otherwise. After the injection operation, suitable means (not shown) may be attached or assembled for holding the glasses over the wearer's eyes or the mold may have provision for receiving such means extending into the cavity and the entire eye glass assembly molded as an integral unit.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claim.

Having thus described our invention, we claim:

In an adjustable split mold apparatus adapted to form a molded unitary optical device composed of plastic material and comprising a pair of spaced opthalmic lenses coextensively joined by a bridge structure and coextensively surrounded by a frame structure, the combination of a pair of cooperatively opposed mold blocks, each of said blocks being provided with a pair of spaced and cooperatively opposed recesses, a single molding cavity of less depth than said recesses entirely surrounding said pairs of recesses and having a surface defining said bridge and frame structure, and an insert replaceably mounted in each of said recesses, said opposing pairs of inserts having molding surfaces adapted to define said lenses, the molding surface of said cavity and the molding surfaces of said inserts forming one substantially continuous molding cavity.

WM. C. EHLERT.
FRANK J. SCHNEIDER, Jr.

REFERENCES CITED

The following references are of record in the file of this patent:

UNITED STATES PATENTS

| Number | Name | Date |
|---|---|---|
| 2,327,665 | Peat | Aug. 24, 1943 |
| 2,424,235 | Hoffer | July 22, 1947 |
| 2,443,826 | Johnson | June 22, 1948 |